(No Model.)
J. G. KERNER.
DISH DRAINER.
No. 573,983.  Patented Dec. 29, 1896.
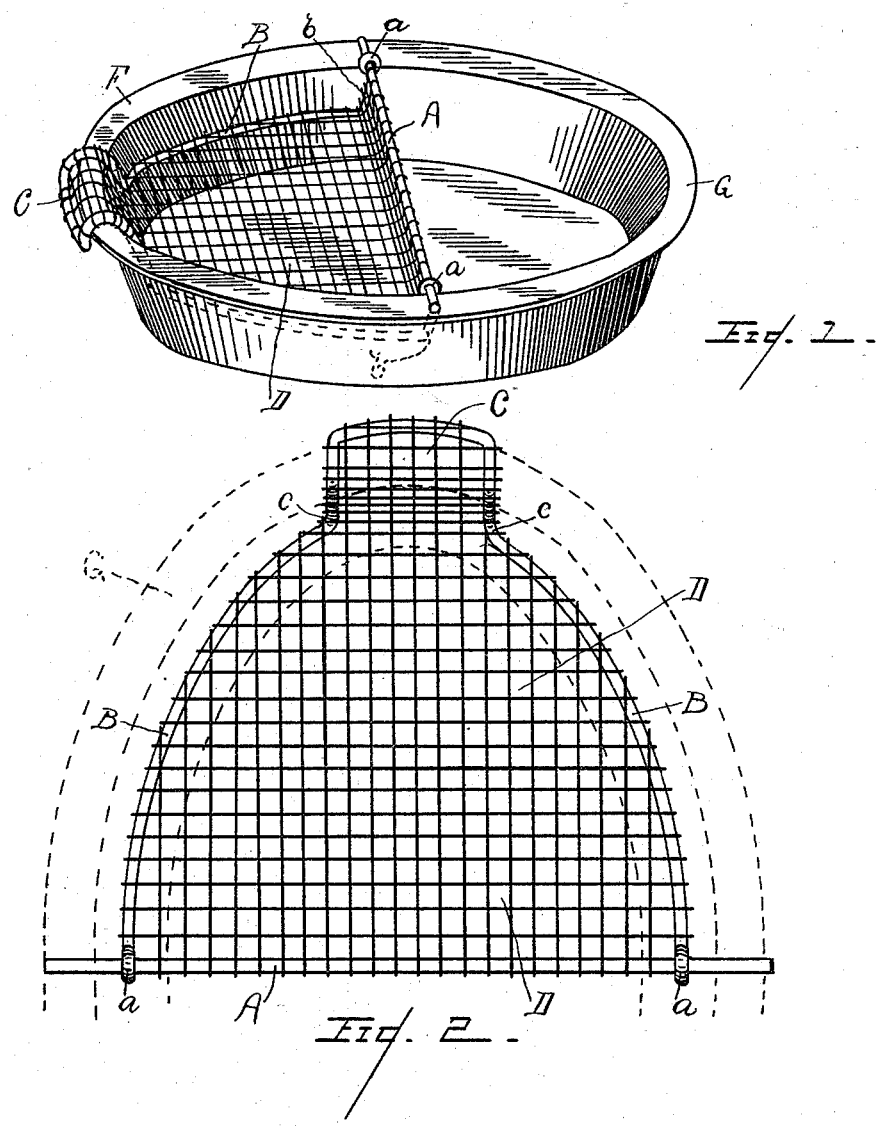
WITNESSES
INVENTOR
John G. Kerner,
By H. Roscoe Wheeler
Attorney.

UNITED STATES PATENT OFFICE.

JOHN G. KERNER, OF CHICAGO, ILLINOIS.

DISH-DRAINER.

SPECIFICATION forming part of Letters Patent No. 573,983, dated December 29, 1896.

Application filed June 20, 1896. Serial No. 596,240. (No model.)

*To all whom it may concern:*

Be it known that I, JOHN G. KERNER, a citizen of the United States, residing at Chicago, in the county of Cook and State of Illinois, have invented certain new and useful Improvements in Detachable Dish-Drainers for Pans; and I do hereby declare the following to be a full, clear, and exact description of the invention, such as will enable others skilled in the art to which it appertains to make and use the same, reference being had to the accompanying drawings, forming a part of this specification.

This invention relates to a new and useful improvement in a detachable dish-drainer for pans; and it consists in the construction and arrangement of parts, as hereinafter fully set forth, and pointed out particularly in the claim.

The object of the invention is to provide a drainer that may be suspended over a portion of the interior of a pan, especially a dish-pan, upon which dishes or other articles may be placed in order that they may be drained and supported while being rinsed, the arrangement being such that the water used in rinsing may fall within the pan, which object is attained by the construction illustrated in the accompanying drawings, in which—

Figure 1 is a general perspective view of a pan provided with my improved drainer mounted thereon; and Fig. 2 is an enlarged plan view of the drainer, showing its relation to a pan by dotted lines.

Referring to the letters of reference, A designates a rod or wire which is of sufficient length to extend across the pan from one side thereof to the other.

B designates a frame which is formed of wire of a gage to give the requisite stiffness thereto, and which frame is coiled around the rod A at one end, as shown at $a$, thence depends downward therefrom to the desired depth, as shown at $b$, thence extends horizontally around the inner side of the pan until it reaches the end thereof, when it is bent upward at $c$ in a vertical direction over the rim F of the pan parallel with said rim for a short distance, forming a tongue C, then back over said rim, and in the manner described for the opposite side of said frame returns to the rod A near the opposite side of the pan, from whence it started.

D represents a wire gauze or netting, which extends from one side of the frame to the other. One end of said netting extends up over the rim of the pan to form a covering for the nose C, from whence it extends back to a point under the rod A, from which latter point it is bent upward and secured thereto.

It will be understood that the frame B will be formed to fit the inner contour of the pan upon which it is to be used, which of course will vary from an angled to a circular form.

By the employment of this drainer, mounted upon the rim of a dish-pan and depending therewithin, as set forth, dishes may be washed in the open end of said pan and laid upon the wire screen D to drain. When as many dishes as desired have been placed upon said screen, hot water may be poured thereover to rinse them, which water, it will be seen, will run down over said dishes through the screen D and into the pan G without waste and heating the water therein, which usually becomes cold after a number of dishes have been washed.

When the drainer is not in use, it may be removed from the pan, said pan and drainer thoroughly cleaned and easily dried, when they may be put away or hung up.

Having thus fully set forth my invention, what I claim as new, and desire to secure by Letters Patent, is—

As an article of manufacture, the supporting-rod A, the frame B secured at its ends thereto, said rod and a portion of said frame adapted to rest upon the rim of a pan, the remainder of said frame depending within the pan and the wire-gauze mounted on said frame, substantially as and for the purpose set forth.

In testimony whereof I affix my signature in presence of two witnesses.

JOHN G. KERNER.

Witnesses:
JOHN A. PRENTIS,
THOS. A. HUBBARD.